United States Patent [19]

Shinoda et al.

[11] 4,120,375
[45] Oct. 17, 1978

[54] TILTABLE CAB CONSTRUCTION FOR AN INDUSTRIAL VEHICLE

[75] Inventors: Akibumi Shinoda, Handa; Noriyoshi Kido, Toyota, both of Japan

[73] Assignee: Kabushiki Kaisha Toyoda Jidoshokki Seisakusho, Japan

[21] Appl. No.: 785,124

[22] Filed: Apr. 6, 1977

[30] Foreign Application Priority Data

Apr. 15, 1976 [JP] Japan ............................. 51/47855[U]
Jul. 30, 1976 [JP] Japan ........................... 51/102413[U]

[51] Int. Cl.² ............................................. B62D 33/06
[52] U.S. Cl. ................................ 180/89.14; 280/756; 296/28 C
[58] Field of Search ......................... 180/89.13–89.18; 280/756; 296/28 C, 35 R, 39 A, 102

[56] References Cited

U.S. PATENT DOCUMENTS

| | | | |
|---|---|---|---|
| 2,362,453 | 11/1944 | Cosper | 296/28 C |
| 2,838,126 | 6/1958 | Gleasman | 180/89.14 |
| 2,951,548 | 9/1960 | Crockett | 180/89.14 |
| 3,088,537 | 5/1963 | LeTourneau | 180/89.14 X |
| 3,578,377 | 5/1971 | Babbit | 296/102 |
| 3,954,150 | 5/1976 | Cole | 280/756 |
| 3,990,737 | 11/1976 | Palmer | 296/28 C X |
| 4,050,735 | 9/1977 | Molnar | 296/102 |

*Primary Examiner*—Joseph F. Peters, Jr.
*Assistant Examiner*—Terrance L. Siemens
*Attorney, Agent, or Firm*—Burgess, Ryan and Wayne

[57] ABSTRACT

In a tiltable cab construction for an industrial vehicle, a tiltable cab which can be tilted with respect to the side frames comprises a steering handle, operating levers, a front protector, a seat, an engine hood, a toe board, a hinge means and other parts, and provides labyrinths which are formed by the tiltable cab and the side frames for reducing noises caused by the engine and other parts which are mounted inside the side frames.

4 Claims, 9 Drawing Figures

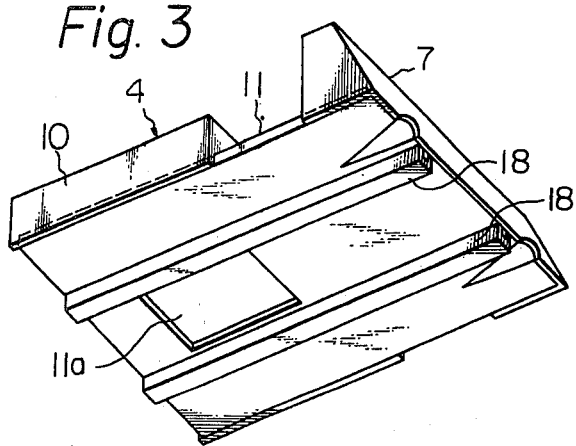
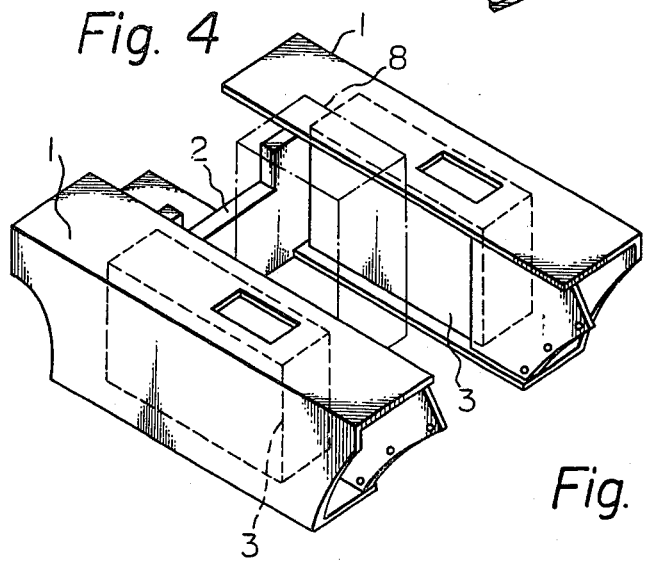
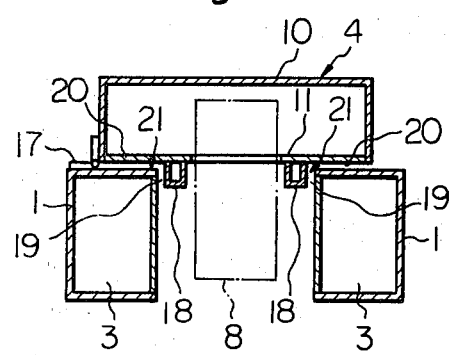

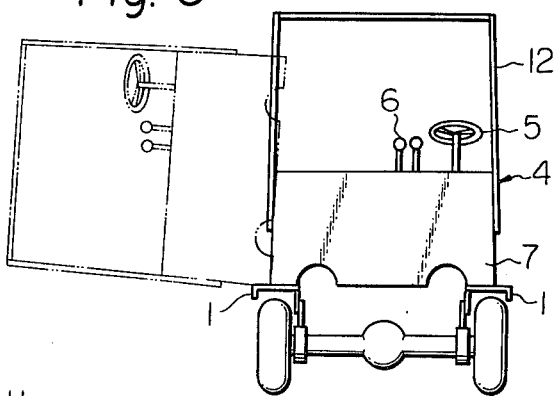
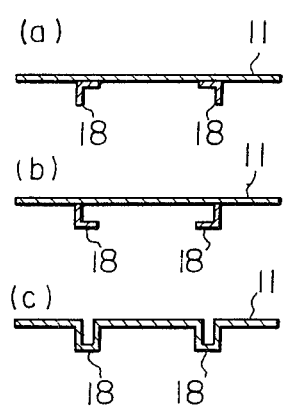
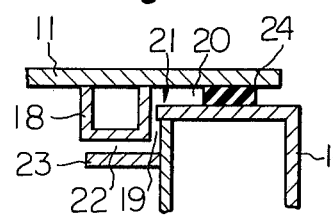
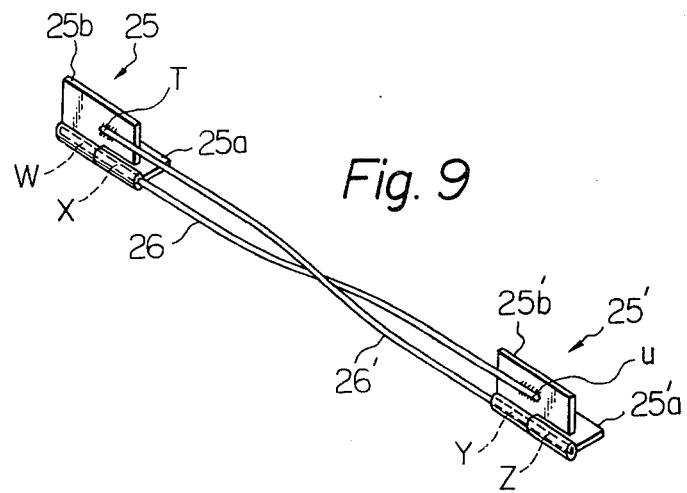

TILTABLE CAB CONSTRUCTION FOR AN INDUSTRIAL VEHICLE

BRIEF DESCRIPTION OF THE INVENTION

The present invention relates to a construction for an industrial vehicle including a lift truck and the like. More particularly, the invention relates to an improved tiltable cab construction for an industrial vehicle, for tilting the cab to one direction, thus permitting an easy access to the driving instruments, such as the reduction gear or the engine and the like, located inside the vehicle, during necessary servicing and repairing thereof.

BRIEF DESCRIPTION OF THE PRIOR ART

In order to obtain such necessary servicing as described above, several designs have already been proposed for the tiltable cab construction. Such a construction provides the tiltable cab with a front protector, a toe board and an engine hood which are connected to each other, and allows the tiltable cab to be rotatably mounted at one of two sides of the side frames so as to be tilted laterally to one side of the vehicle.

The disadvantages of the above-described construction reside in that such tiltable cab does not have enough constructional strength, therefore, if the tilting operation is repeated too often, certain disadvantageous drawbacks, will occur, i.e. deformations or partial crackings of the tiltable cab.

In order to effect the tilting movement, provided at one side of the tiltable cab are hinges or the like, and provided at the opposite side of the cab are fixing means for maintaining the tiltable cab in a normal position, i.e. the position in which the tiltable cab is resting on the side frames.

As a result of the above provisions, gaps are unavoidably created between the tiltable cab and the side frames. For this reason, the above-described construction has a further drawback wherein loud noises caused by the engine, the pump-motors and the like disposed in an engine compartment of the vehicle are emitted through the gaps to the surrounding environment. The above-described tiltable cab is heavy in weight due to the fact that it comprises many heavy members, i.e. the front protector, the engine hood, the toe board and, moreover, the head guard. Therefore, it takes a considerable amount of force to tilt the tiltable cab.

OBJECTS OF THE INVENTION

Accordingly, it is a general object of the present invention to overcome the aforementioned disadvantages by providing an improved tiltable cab construction for an industrial vehicle.

It is an object of the present invention to provide a strong tiltable cab by utilizing specially arranged reinforcing members along the tiltable cab.

It is another object of the present invention to provide an improved tiltable cab construction which can reduce the volume of the noises being emitted from the engine room.

It is a further object of the present invention to provide an improved tiltable cab construction which can be handled in a manner which is far easier than that of the prior art.

Other further objects of this invention will become obvious after understanding the illustrative embodiments described hereinafter or indicated in the appended claims, whereby various advantages not referred to herein will certainly occur when this invention is carried out by one skilled in the art.

BRIEF DESCRIPTION OF THE DRAWINGS

A preferred embodiment of the invention will now be described in detail with reference to the accompanying drawings, wherein the same reference numerals are used to designate similar parts throughout the several views, in which:

FIG. 3 is a perspective view showing a tiltable cab of FIG. 2;

FIG. 4 is a partially cutaway view in perspective showing the side frames of FIG. 2;

FIG. 5 is a cross-sectional view showing the relation between the tiltable cab and the side frames according to the present invention;

FIG. 6 is an elevational view showing the tiltable cab in its operating position;

FIG. 7 is a cross-sectional view of the labyrinth construction showing another modification of the tiltable cab;

FIG. 8 are cross-sectional views showing various modifications of the reinforcing members; and FIG. 9 is a perspective view of the hinges with torsion bars.

DETAILED DESCRIPTION OF THE INVENTION

Figure 1:
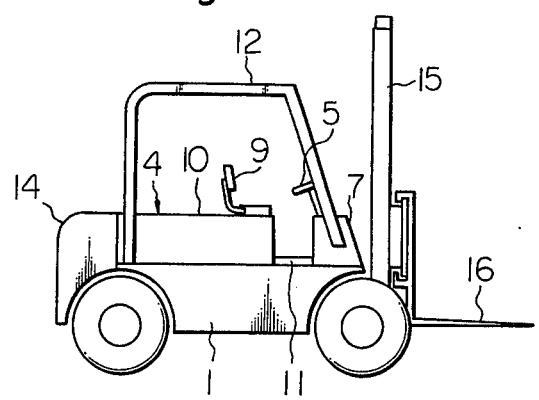
FIG. 1 is a schematic side view showing a conventional lift truck.

The present invention will now be explained hereinafter in detail with reference to the embodiments thereof which are represented in the accompanying drawings. In this case, such embodiments are, for example, illustrated with reference to a lift-truck.

Referring now to the drawings and more particularly to FIGS. 1 through 4, a lower portion of a vehicle comprises two side frames 1, one disposed at each of the two sides of the vehicle, and a rear panel 2 connected between the two side frames 1. Provided inside each of the two side frames is an oil tank 3 for containing fuel or operation oil, respectively. An upper portion of the vehicle comprises a tiltable cab 4 (shown in FIG. 2). This tiltable cab 4 comprises a steering handle 5; a front protector 7 which provides several operating levers 6 for the actuator 5 (not shown) and several gauges (not shown), and which protects the front side of a seat; an engine hood 10 which covers driving instruments 8, such as the engine, the pumps, the electric motors and the like, and which has a seat 9 thereupon; and a toe board 11 which is disposed between the front protector 7 and the engine hood 10, the three members 7, 10 and 11 being interconnected with each other.

As three of the above members, i.e. the front protector 7, the engine hood 10, and a toe panel 11, are generally formed by thin steel plates; these three members may be individually molded in one body by means of a press machine.

However, assuming that the toe board 11 has the same length as the distance between the front end of the front protector 7 and the rear end of the engine hood 10, and that the plate of the toe board has an opening 11a through which the driving instruments can pass, then after individually molding these three members, the members may be interconnected by a suitable fixing means, e.g. by welding, as shown in FIG. 3.

Figure 2:
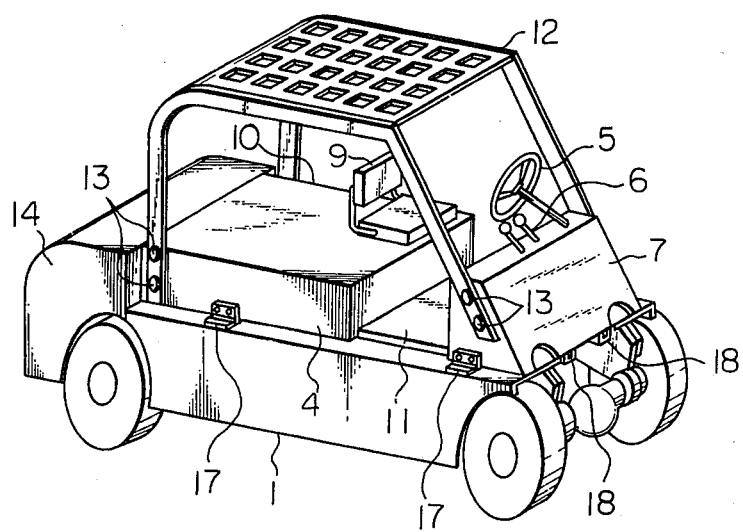
FIG. 2 is a perspective general view showing a tiltable cab construction for an industrial vehicle according to the present invention.

In FIG. 2, a head guard 12 is removably attached to both the outer side of the rear end portion of the engine hood 10 and the outer side of the forward end portion of the front protector 7 by means of the bolts 13. The head guard 12 is adapted to protect the driver sitting on the seat 9, and such head guard is separately formed from the cab 4. Numerals 14, 15 and 16 indicate a balance weight, a mast and a fork, respectively.

The tiltable cab 4 constructed as described above is provided at one of the lower sides with a pair of aligned hinges 17, which are pivotably connected to the corresponding upper surface of one of the side frames 1, so that the cab 4 may be tilted laterally to either side of the side frames 1 as shown in FIG. 6. At the opposite side of the cab 4 with respect to the hinges 17, a suitable fixing means (not shown in the drawings) is provided and adapted for maintaining the normal position of the tiltable cab 4. Two longitudinally disposed reinforcing members 18 are fixed underneath the surface of the toe board 11 in the tiltable cab 4, as illustrated in FIG. 3. The reinforcing members 18 have substantially the same length as the length of the tiltable cab 4 and as the length of the side frames 1.

The reinforcing members 18, in the present case, are formed by channel frame members which are connected to the lower surface of the toe board 11 by the usual manner, e.g. by welding.

As shown in FIG. 5, when the tiltable cab 4 is in the normal position resting on the side frames 1, i.e. in the position wherein the engine room is covered by the toe board 11, each outer surface of the reinforcing members 18 is adjacently disposed to each inner surface of the side frames 1.

Gaps are provided between the reinforcing members 18 and the side frames 1 so as to prevent the members 18 from interfering with the side frames 1, during when the cab 4 is positioned either in a normal position or in an operating position. In the event that the two reinforcing members 18 are disposed as described above, two sets of narrow plane passages 19 and 20 are arranged between the tiltable cab 4 and the side frames 1. One set of passages 19 is formed between the outer surfaces of the reinforcing members 18 and the inner surfaces of the side frames 1. The other set of passages 20 is formed between the lower surfaces of the reinforcing members 18 and the upper surfaces of the side frames 1, respectively. Thus, labyrinths 21 are formed in combination with the passages 19 and 20.

As a result, due to the presence of the reinforcing members 18 the structure of the tiltable cab 4 can be strengthened so as to prevent deformations from occurring in the structure as a result of frequent repeated tilting operations of the cab 4. In addition, the labyrinths 21 formed between the tiltable cab 4 and the side frames 1 can greatly reduce noises radiating from the engine room to the surrounding environment. As to the radiations of noises from the engine room toward the front and back directions of the vehicle and also in the direction beneath the vehicle, such noises may be prevented by means of sound-absorbing walls (not shown) which are provided inside the side frames 1.

In FIG. 7 showing a variation of the labyrinths, the inner surfaces (or the walls of the oil tanks 3) of the side frames 1 and below the lower surfaces of the reinforcing members 18 are provided with longitudinally extending plate members 23 so as to form narrow passages 22 between the reinforcing members 18 and the plate members 23. Thus, the labyrinths 21 in this embodiment have a more complicated structure in comparison with those shown in FIG. 5. Moreover, longitudinally extended rubber mats 24, which have the same length as the length of the members 18, are provided between the lower surfaces of the tiltable cab 4 and the outer peripheries of the upper surfaces of the side frames 1.

Consequently, due to the labyrinths and the rubber mats of this embodiment, the reduction of the radiating noises can be carried out more effectively.

FIG. 8 shows further variations of the reinforcing members 18, in which the reinforcing members 18 shown in FIG. 8(a) and FIG. 8(b) are formed by the same cross-sectional members having the same angles.

However, the reinforcing members 18 in 8(a) differ from the members 18 in 8(b) due to their different directions of attachment to the lower surface of the toe board 11. FIG. 8(c) shows the reinforcing members 18 which are made in one body with the toe board 11 by press works. In each variation, the effectiveness of the labyrinths and of the reinforcing members is almost the same as that of the embodiment shown in FIG. 5.

As mentioned above, the tiltable cab 4 is constructed so that it can be tilted laterally to either side of the two side frames 1. However the tiltable cab 4 can be constructed so that it can be tilted toward the front direction or toward the back direction of the vehicle. The reinforcing members 18 according to the present invention can also be applied to the conventional industrial vehicle, in which only the engine hood can be tilted laterally, frontwards or rearwards of the side frames 1.

FIG. 9 shows a pair of hinges 25 and 25' wherein the two hinges are connected by two torsion bars 26 and 26' being biased to each other for continuously urging the tiltable cab 4 toward the direction of its tilting. Thus, an easier tilting operation operation of the tiltable cab 4 can be performed by the aid of the torsion bars 26 and 26'. Each of the ends X, Z of the torsion bars 26 and 26' is secured to each of the fixed hinge plates 25a and 25'a, respectively, which plates are fixed to one of the side frames 1. Each of the ends W, Y of the torsion bars 26 and 26' is passed through each of the corresponding movable hinge plates 25b and 25'b, respectively, which plates are fixed to one side of the tiltable cab 4. Each of the ends T, U of the torsion bars 26 and 26' is then secured to each of the corresponding movable hinge plates 25b and 25'b, respectively. Consequently, the cab 4 fixed to the movable hinge plates 25b and 25'b is urged in a forward direction (in FIG. 9) by means of torsion bars 26 and 26'.

As mentioned above, in the present case, the torsion bars 26 and 26' are also used for, generating the tilting movement of the cab 4. However, hydraulic cylinders may also be used for this purpose.

When the tiltable cab 4 is tilted to either side of the vehicle, all of the instruments, i.e. a steering handle 5 the operation levers 6 provided in the front protector 7, and the pedals (not shown in the drawings) provided in the toe board 11 are tilted together with the tiltable cab 4. The steering handle 5, operation levers 6 and pedals are designed so as to be individually connected at their respective connecting points in order to prevent disconnections thereof from occurring during when the tiltable cab 4 is in its operation position.

According to the foregoing detailed description of the construction, two longitudinally disposed reinforcing members are provided at the lower surface of the tiltable cab for forming labyrinths between the tiltable cab and the side frames. Therefore, in the present invention exhibiting such labyrinths, the tiltable cab can be strengthened by means of the reinforcing members, thereby preventing deformations or crackings thereof in spite of frequent tilting operations of the tiltable cab. Furthermore, radiations of the noises from the engine room may be greatly reduced by the labyrinths which are formed between the tiltable cab and the side frames. Further yet, an easier tilting operation of the cab can be obtained by employing special hinges.

The construction of the present invention has the following additional advantages. Due to the fact that the tiltable cab is provided with the above-mentioned reinforcing members, the cab can be protected from yawing in the lateral direction, should the tiltable cab be subjected to a big shock caused by an accident from the outside. Even if the hinges are broken during an accident, the cab will still be protected from shifting in the lateral directions.

Although the invention was described with reference to a lift truck by way of example, the construction according to the present invention can be widely applied to other industrial vehicle used in civic work or in agriculture, wherein attachment devices, i.e. for purposes of lifting, pushing or rolling, can be provided at the front or at the rear of such vehicles.

While various changes and modifications may be made in the construction disclosed herein, it is to be understood that the invention is to be limited only within the terms of the appended claims.

What is claimed is:

1. An industrial vehicle comprising:

first and second parallel side frame members;

at least one cross-member interconnecting said frame members;

vehicle operating and drive apparatus disposed between said frame members;

a cab including an engine hood, a toe board, a front protector, vehicle driving and operating means and a driver's seat, said cab being supported by and disposed atop said frame members and extending therebetween, one side of said cab being pivotally mounted by hinge means to one of said frame members, the other side of said cab being detachably secured to the other frame member;

said cab having two longitudinal reinforcing members affixed thereto beneath said hood and toe board and disposed between and parallel to said side frame members, each of said reinforcing members being near a corresponding said frame members, with a small space therebetween;

said cab being spaced from said one frame member by said hinge means;

a resilient mat disposed on the other frame member for supporting said cab;

whereby the spaces between (i) said reinforcing members and said frame members and (ii) said cab and said frame members comprise labyrinths for attenuating noise generated by said apparatus.

2. The vehicle according to claim 1 wherein between the toe board of the cab and the upper surfaces of the side frame members are provided two longitudinally disposed rubber mats, said mats having the same length as the length of the corresponding side frame members.

3. The vehicle according to claim 1 wherein said hinge means comprises two spaced-apart hinges interconnected by two torsion bars biased has urging means for continuously urging said cab toward the tilting direction thereof to pivot said cab away from said other frame member.

4. The vehicle according to claim 1, further comprising first and second noise suppression plate members extending inward from respective ones of said side frame members slightly beneath corresponding ones of said reinforcing members, thereby effectively extending said labyrinths.

* * * * *

UNITED STATES PATENT OFFICE
CERTIFICATE OF CORRECTION

Patent No. 4,120,375    Dated  October 17, 1978

Inventor(s)  Akibumi Shinoda, et al

It is certified that error appears in the above-identified patent and that said Letters Patent are hereby corrected as shown below:

Column 2, line 42:  Change "one disposed at each" to --each being disposed at one--.

Signed and Sealed this

Nineteenth Day of June 1979

[SEAL]

Attest:

RUTH C. MASON
Attesting Officer

DONALD W. BANNER
Commissioner of Patents and Trademarks